(12) United States Patent
Baker et al.

(10) Patent No.: US 10,012,157 B2
(45) Date of Patent: Jul. 3, 2018

(54) INTERNAL COMBUSTION ENGINE WITH EXHAUST TURBOMACHINES

(71) Applicant: JAGUAR LAND ROVER LIMITED, Warwickshire (GB)

(72) Inventors: Alan Baker, Coventry (GB); James Turner, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 18 days.

(21) Appl. No.: 14/787,827

(22) PCT Filed: May 1, 2014

(86) PCT No.: PCT/EP2014/058947
§ 371 (c)(1),
(2) Date: Oct. 29, 2015

(87) PCT Pub. No.: WO2014/177672
PCT Pub. Date: Nov. 6, 2014

(65) Prior Publication Data
US 2016/0084177 A1  Mar. 24, 2016

(30) Foreign Application Priority Data
May 1, 2013 (GB) .................................. 1307889.4

(51) Int. Cl.
*F02D 41/00* (2006.01)
*F02B 37/007* (2006.01)
(Continued)

(52) U.S. Cl.
CPC ............ *F02D 41/0007* (2013.01); *F01L 1/34* (2013.01); *F02B 33/40* (2013.01); *F02B 37/007* (2013.01);
(Continued)

(58) Field of Classification Search
CPC ............ F02D 41/007; F02D 2014/001; F02D 13/0249; F02B 37/183; F02B 37/013; F02B 33/40; F01L 1/34
See application file for complete search history.

(56) References Cited

U.S. PATENT DOCUMENTS 4,774,811 A * 10/1988 Kawamura .............. B60K 6/24
                                                    180/165
6,062,178 A *  5/2000 Meyers ................... F02B 25/02
                                                    123/336
(Continued)

FOREIGN PATENT DOCUMENTS

DE       3826956 A1   2/1990
DE  10-2008-036308 A1   2/2010
(Continued)

OTHER PUBLICATIONS

Machine Translation of JP 10169455, Translated on Feb. 14, 2017.*
(Continued)

*Primary Examiner* — Patrick Maines
(74) *Attorney, Agent, or Firm* — Carlson, Gaskey & Olds

(57) ABSTRACT

An internal combustion engine has two exhaust valves (24, 25) per combustion chamber (21), and variable valve timing for each exhaust valve. The exhaust valves (24, 25) are associated with respective exhaust tracts (26, 27) including a turbocompounder (31) and a turbocharger (41). The turbine exhaust from one of the turbomachines is directed to turbine inlet of another of the turbomachines.

20 Claims, 4 Drawing Sheets

(51) Int. Cl.
  *F02B 37/013* (2006.01)
  *F01L 1/34* (2006.01)
  *F02B 33/40* (2006.01)
  *F02B 37/18* (2006.01)
  *F02D 13/02* (2006.01)

(52) U.S. Cl.
  CPC .......... *F02B 37/013* (2013.01); *F02B 37/183* (2013.01); *F02D 13/0249* (2013.01); *F02D 13/0257* (2013.01); *F02D 2041/001* (2013.01); *Y02T 10/144* (2013.01)

(56) References Cited

U.S. PATENT DOCUMENTS

| | | | | |
|---|---|---|---|---|
| 6,378,308 | B1* | 4/2002 | Pfluger | F01N 13/107 123/559.1 |
| 2006/0070382 | A1* | 4/2006 | Karlsson | F02B 37/001 60/612 |
| 2007/0119168 | A1 | 5/2007 | Turner | |
| 2009/0223220 | A1* | 9/2009 | Vuk | F02D 13/0249 60/602 |
| 2009/0241540 | A1* | 10/2009 | Robel | F02D 13/0249 60/597 |
| 2011/0154819 | A1 | 6/2011 | Robel | |

FOREIGN PATENT DOCUMENTS

| | | | | |
|---|---|---|---|---|
| EP | 1400667 | A2 * | 3/2004 | ............ F02B 37/001 |
| GB | 2423797 | A * | 9/2006 | ............ F02B 33/34 |
| JP | 61164039 | A | 7/1986 | |
| JP | 01117939 | A * | 5/1989 | ............ F02B 41/10 |
| JP | 10169455 | A * | 6/1998 | |

OTHER PUBLICATIONS

International Search Report for International application No. PCT/EP2014/058947 dated Jul. 23, 2014.
Combined Search and Examination Report under Sections 17 and 18(3) for Application No. GB1307889.4 dated Oct. 31, 2013.

* cited by examiner

INTERNAL COMBUSTION ENGINE WITH EXHAUST TURBOMACHINES

This invention relates, particularly but not exclusively, to an internal combustion engine having a plurality of exhaust turbomachines, to a method of improving the efficiency of an internal combustion engine, and to a vehicle incorporating such an engine and method of operation.

BACKGROUND TO THE INVENTION

Exhaust turbomachines, in particular exhaust turbochargers, are often provided to extract work from the exhaust stream of an internal combustion engine.

Exhaust turbochargers, which may be multi-stage, are typically used to boost air provided to the inlet tract of the engine. An exhaust turbocharger is often provided with a bypass whereby the turbine inlet and turbine outlet are directly connected; such a bypass is useful to prevent overspeeding of the turbocharger, and to reduce cold start time of an exhaust catalyser.

Another kind of exhaust turbomachine is an exhaust turbocompounder. Such a machine is typically used to extract work from the exhaust stream, and to provide mechanical, electrical or hydraulic power. A turbocompounder may for example be mechanically coupled to an engine crankshaft, or may drive an electrical generator.

Exhaust turbomachines have many benefits. They must however be used carefully, in particular to prevent an increase in back pressure on the engine, which could prevent effective scavenging of exhaust gases with a consequent reduction in engine performance.

GB-A-2423797 (Lotus) discloses a multi-cylinder internal combustion engine having two exhaust valves per cylinder, and the exhaust valves having respective exhaust manifolds connected one each to an exhaust turbocharger and to an exhaust turbocompounder. A variable valve train permits the opening duration of each exhaust valve to be varied, thereby changing the proportion of exhaust flow to each turbomachine, and promising better conversion of exhaust gas energy into useful work over the range of speed and load of the engine.

The present invention provides an improved arrangement of exhaust turbomachines capable of extracting work from an exhaust gas stream whilst maintaining efficient operation of the internal combustion engine.

SUMMARY OF THE INVENTION

According to one aspect of the invention there is provided an internal combustion engine having a combustion chamber with two exhaust ports, each exhaust port having a respective exhaust valve for controlling independently the flow therethrough, wherein the respective exhaust ports are coupled via respective exhaust tracts to respective turbomachines, the turbine outlet of one turbomachine being connectable to the turbine inlet of the other turbomachine.

Thus, in embodiments of the invention the two exhaust valves are independently controllable to vary the timing and proportion of exhaust gas flowing through each exhaust tract, and thereby reaching the turbomachines. In particular the initial high pressure (blow down) pulse of exhausting gas can be passed via one exhaust tract, whilst the subsequent relatively low pressure exhaust stream can be passed to the other exhaust tract. The exhaust valves may be variable in duration of opening and/or timing of opening with respect to crank angle, and/or opening area (valve lift of a poppet valve). The exhaust valves may be of different sizes. In this way the exhaust valves may be chosen and configured to provide desirable flow characteristics in the exhaust. Also, smaller valves may be fitted more easily into the engine if space is an issue.

In one embodiment said one turbomachine has an upstream turbine bypass tract directly connecting the inlet to the outlet thereof, said upstream bypass tract being controlled by an upstream bypass valve.

In one embodiment said other turbomachine has a downstream turbine bypass tract connecting the inlet to the outlet thereof, said downstream bypass tract being controlled by a downstream bypass valve.

Thus one or both turbomachines may include a turbine bypass tract whereby substantially all of the relevant proportion of exhaust flow can bypass the turbine. This arrangement increases the possibilities for maximizing conversion of exhaust gas energy having regard to the instant demand being placed on the engine. The terms 'upstream' and 'downstream' merely serve to distinguish the bypass tracts of the two turbomachines, which may also be considered upstream and downstream with respect to the exhaust stream path.

In an embodiment a further turbomachine is provided in the exhaust tract to the other turbomachine, and this further turbomachine may also have a turbine bypass tract.

The further turbomachine is in parallel with said one turbomachine; each of these turbomachines constitute a first stage to which exhaust gas may flow in the proportions determined by respective exhaust valves, and from which exhaust gas may be directed through a second stage turbomachine, namely said other turbomachine.

In an embodiment of the invention the turbomachines comprise at least one exhaust turbocharger and at least one exhaust turbocompounder. The exhaust turbocompounder may be upstream or downstream of an exhaust turbocharger.

The respective exhaust valves are in one embodiment operated by respective exhaust valve timing systems whereby the opening area and/or opening duration may be varied according to a control algorithm to direct exhaust gas flow to a desired turbomachine. For example the initial pressure pulse (blow down) may be directed to a turbocompounder, whereas the subsequent lower pressure scavenging volume may be directed to a turbocharger. This arrangement ensures satisfactory scavenging of the engine following a combustion event, whilst avoiding excessive back pressure.

Typically a multi-cylinder engine is provided with two sets of exhaust valves associated with respective exhaust tracts.

In this specification the term 'scavenging' is used to refer to the process whereby exhaust gases exit from a combustion chamber. In a reciprocating piston engine this occurs on the exhaust stroke.

The invention also provides a method of improving the efficiency of an internal combustion engine according to the first aspect and having an exhaust turbocharger and an exhaust turbocompounder, the method comprising directing an initial portion of the exhaust stream to the turbine of said turbocompounder, and directing the turbine exhaust of said turbocompounder to the turbine inlet of said turbocharger.

Other features of the invention will be apparent from the claims appended hereto.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

One or more embodiments of the invention will now be described, by way of example only, with reference to the accompanying drawings in which:—

FIG. 1 illustrates a typical pressure characteristic 10 as the exhaust valve of a reciprocating internal combustion engine opens. Pressure (P) is illustrated against time (t), (or crank angle ° CA). Prior to opening of the exhaust valve, the pressure within the combustion chamber is relatively high compared with that in the exhaust manifold. As the valve opens a short initial high pressure pulse 11 quickly subsides to a low level 12, which continues until the piston has swept combustion products from the combustion chamber.

If less fuel is being burnt on each combustion cycle, for example due to a low or no power demand, the high pressure pulse is progressively diminished, as illustrated for example by the dotted line characteristic 13.

Exhaust gas energy is typically recovered in an exhaust turbocharger in which the flow of exhaust gas is used to rotate a turbine, which in turn rotates a compressor of inlet air to the engine. Exhaust turbochargers are well-known and need not be further described here in detail.

A feature of most turbochargers is the provision of a wastegate whereby excess exhaust gas is diverted around the turbine, typically to prevent overspeeding thereof. When the wastegate is open, the possibility of energy recovery from this portion of the exhaust gas stream is lost. It has been recorded that up to half of the energy of an exhaust gas stream may be lost through the wastegate at maximum power.

In order to recover more energy from the exhaust gas stream, in particular from the initial pressure pulse as the exhaust valve is opened, it has been proposed to provide a so-called turbocompounder whereby the exhaust gas stream drives a turbine, which is in turn linked directly to the vehicle engine, or to an electrical generator, or to a hydraulic pump. Turbocompounders are provided, for example, on diesel engines for heavy goods vehicles.

One problem with turbocompounders is that operation thereof tends to impose significant back pressure on the exhaust tract upstream thereof, which in turn may prevent effective and timely emptying of exhaust gas from the combustion chamber.

Figure 3:
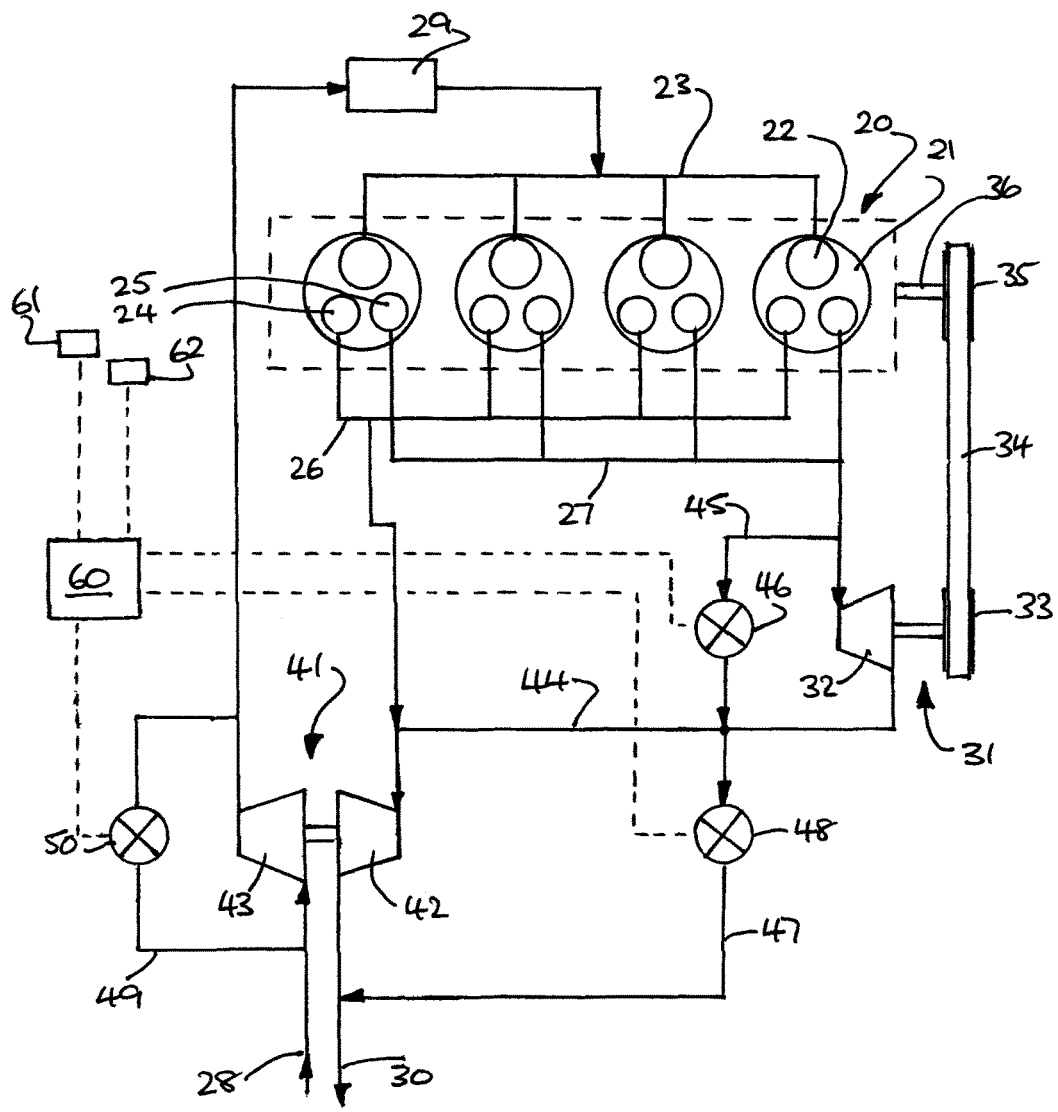
FIG. 3 illustrates schematically one embodiment of the invention.

With reference to FIG. 3 a four cylinder, in-line, reciprocating piston, internal combustion engine 20 comprises four identical cylinders 21 each having an inlet valve 22 coupled to an inlet manifold 23, and two exhaust valves 24, 25 coupled to respective exhaust manifolds 26, 27. The number of inlet valves 22 is not important in this invention, and for simplicity only one per cylinder is shown; more could be provided if desirable. The exhaust manifolds 26, 27 define independent exhaust tracts, so that the exhaust stream is divided immediately downstream of each cylinder. The valves are typically conventional spring loaded poppet valves, opened and closed by a suitable camshaft arrangement.

In embodiments of the invention, the operation of one or both sets of exhaust valves is controlled by one or more variable devices of known kind which may vary the timing of valve opening and closing with respect to an engine output member (typically crank angle), and/or may vary the duration of opening, and/or may vary the size of the aperture defined by a valve during the period for which it is open. Thus for a poppet valve, the valve lift may be adjusted to more or less throttle the flow of exhaust gas therethrough, and accordingly to permit flow of exhaust gas from the cylinder more or less quickly.

Valves may be operated in unison by, for example, a camshaft. Valves may also be operated by individual actuators, in which case each set of individual actuators may be operated in unison. This invention is not concerned with variable valve timing as such.

In an embodiment, the exhaust valves associated with each exhaust manifold are operated in common, thus with the same characteristics of timing, duration and aperture. However the two sets of exhaust valves will typically have different operating characteristics.

In the embodiment of FIG. 3, two turbomachines are provided, comprising a turbocompounder 31, and a turbocharger 41.

The turbocompounder 31 comprises a turbine 32 connected to the exhaust manifold 27, and having an output pulley 33 connected by belt 34 to a pulley 35 of an engine crankshaft 36. This output arrangement is schematic, and for illustration purposes only. In practice a variable speed drive to the crankshaft may be provided, or the turbine 32 may be connected to an electrical generator or to a hydraulic pump. The output aspects of the turbocompounder form no part of the invention as such, save that energy is recovered from the exhaust gas stream.

The turbocharger 41 comprises a turbine 42 and compressor 43 of known kind. The turbine 42 has an inlet connected to the exhaust manifold 26 and an outlet connected to an exhaust tailpipe 30.

The compressor 43 has an inlet for receiving air from an air inlet 28, and an outlet connected to the inlet manifold 23 via a conventional intercooler (or charge air cooler) 29.

The outlet of the turbine 32 is connected to the inlet of the turbine 42 via tract 44, so that the turbocharger 41 is downstream of the turbocompounder 31.

Several bypass arrangements are also provided whereby each turbine and compressor may be made wholly or partially ineffective.

A first bypass passage 45 is provided around the turbine 32, and is opened and closed by actuation of a bypass valve 46. A second bypass passage 47 is provided around turbine 42, and is opened and closed by actuation of a bypass valve 48. Finally a third bypass passage 49 is provided around the compressor 43, and is opened and closed by actuation of a bypass valve 50.

The bypass valves 46, 48, 50 are under the control of an electronic control unit (ECU) 60, which also determines the timing, duration and opening area of the exhaust valves via respective valve timing modules 61, 62.

The exhaust bypass valves 46, 48 are in use opened to permit exhaust gas to flow around the respective turbine in the downstream direction according to a control algorithm or program. The inlet bypass valve 50 allows inlet air flow to bypass the compressor 43, for example when stationary due to bypassing of the turbine 42; in this condition, natural (unassisted) aspiration is improved.

The inlet bypass valve 50 may also provide a conventional blow-off or surge valve whereby excess inlet pressure downstream of the compressor 43 may be vented to the inlet side. Alternatively a blow-off valve (not shown) may vent from the downstream side of the compressor to atmosphere.

In use the engine 20 is typically capable of operation over an operating range, from tickover at minimum speed to maximum power at maximum speed. Various operating parameters of the engine are typically adjusted, in particular valve timing, ignition timing and fuelling, to provide an appropriate operating characteristic, with minimum fuel consumption and minimum undesirable emissions. Such adjustments are generally made under the control of an engine electronic control unit, and may not be apparent to the driver of a vehicle in which such an engine is fitted.

As noted above, the energy of high exhaust gas pressure may be recovered in a turbocompounder, and the arrangement of FIG. 3 provides for the following possibilities downstream of the exhaust manifolds 26, 27.

When little power is required from the engine, the bypass valves 46, 48 may be commanded open, so that the turbines 32, 42 are bypassed; exhaust gas flow is not restricted. The inlet bypass valve 50 may also be commanded open to ensure a clear pathway for natural aspiration.

The exhaust bypass valves may also be commanded open during an engine warm-up phase, so as to ensure that the usual exhaust catalyser reaches operating temperature as soon as is practicable.

In the normal operating range of the engine, some turbocharging of the inlet air stream may be desirable, in which case the bypass valve 46 may be open, and the bypass valve 48 be closed. In this condition, substantially all exhaust gas flow passes through the turbocharger turbine 42 to permit extraction of energy therefrom.

At high power outputs, when exhaust gas energy may be lost through operation of a wastegate, the exhaust bypass valve 46 may be closed to permit exhaust gas energy to be extracted via the turbine 32 of the turbocompounder 31. In this condition the outlet flow from the turbocompounder passes to the turbocharger 41 to permit a further extraction of residual exhaust gas energy.

In addition to these basic operating principles, the two sets of exhaust valves 24, 25 may be controlled to direct exhaust gas favourably to one or both turbomachines 31, 41.

Energy extraction can, for example, be maximized by directing an initial high pressure pulse through exhaust manifold 27 to the turbocompounder 31, and the subsequent lower pressure of cylinder scavenging through exhaust manifold 26 to the turbocharger 41. This can be accomplished by controlling exhaust valve timing to open the exhaust valves 25 for an initial short period, followed by the exhaust valves 24 for a longer period sufficient to ensure that all exhaust gas can be swept from the cylinders in accordance with the intended operating cycle of the engine.

Operation of the sets of exhaust valves 24, 25 may overlap, and as noted above size of opening, the timing and the duration of opening may be controlled via the operating modules 61, 62.

Figure 1:
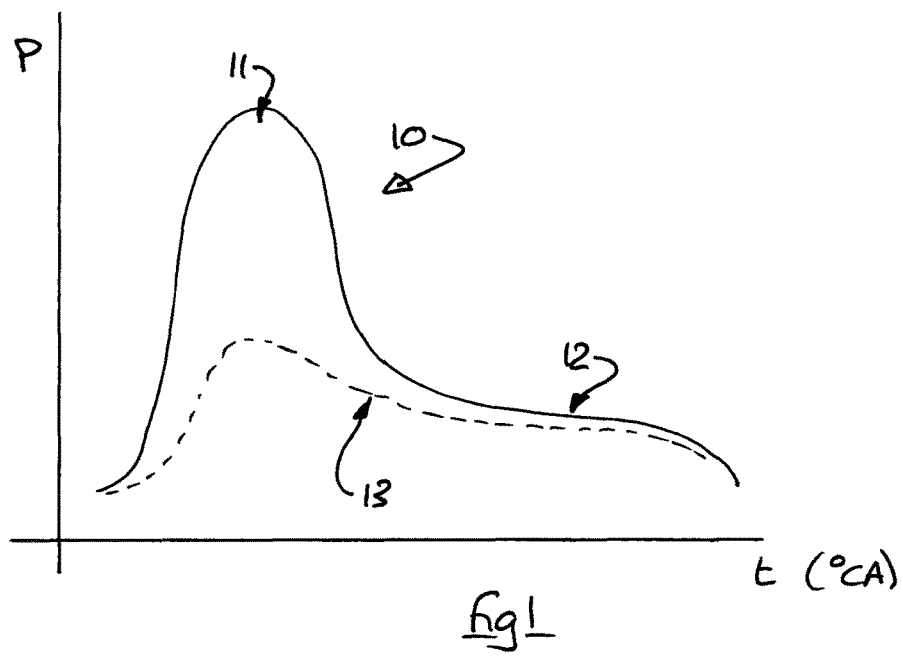
FIG. 1 illustrates graphically the relationship between exhaust gas pressure and crank angle for the duration of exhaust valve opening.
Figure 2:
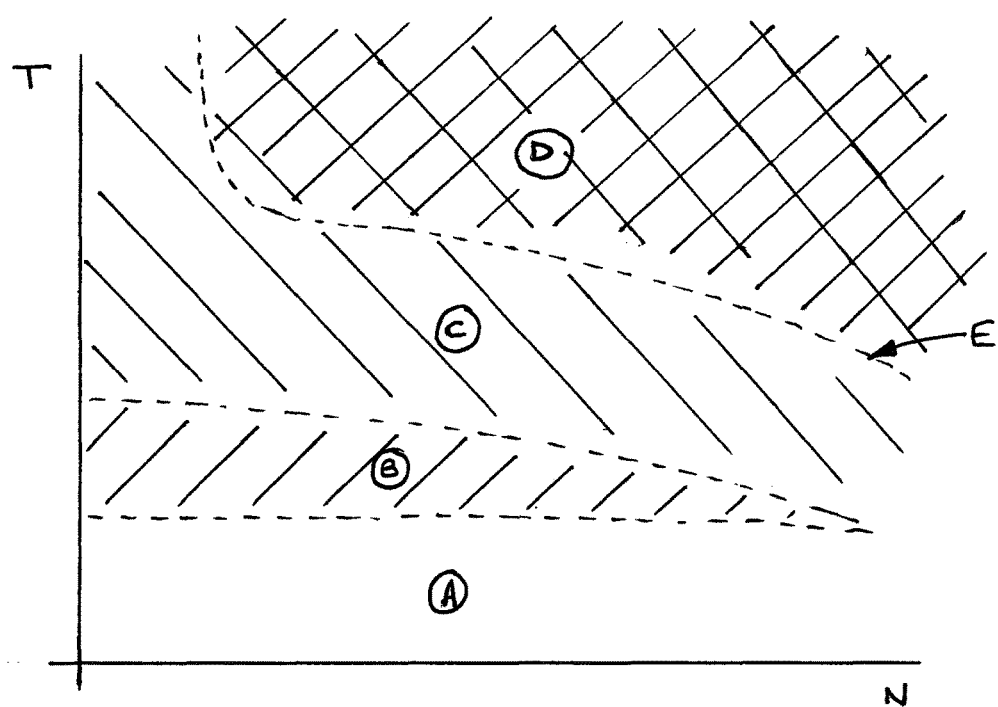
FIG. 2 illustrates graphically a torque/speed relationship of an engine, and the anticipated operating regions of a turbocharger and a turbocompounder.

FIG. 2 shows an exemplar operating regime for the arrangement of FIG. 3, and plots the characteristic of engine output torque (T) against engine speed (N).

In a first zone A, the required engine torque output is low, and accordingly neither turbocharger nor turbocompounder is required; bypass valves 46, 48 and 50 are open. In this zone, the energy available for recovery from exhaust gas flow may be very low.

In a second zone B, the required torque output is higher, but nevertheless turbocharging is not necessary. In this condition some exhaust gas energy may be recovered by turbocompounding, and according bypass valve 46 is closed whereas bypass valves 48, 50 are open.

In a third zone C, it may be necessary to operate only the turbocharger, and accordingly bypass valve 46 is open whereby bypass valves 48, 50 are closed.

Finally, in a fourth zone D exhaust energy is again sufficient to permit a proportion to flow through the turbocompounder 31 in addition to that flowing through the turbocharger 41. The turbocompounder proportion may be as great as that proportion which would be lost via conventional turbocharger wastegate, so that boundary E represents the wastegate opening characteristic.

The boundaries shown in FIG. 2 are illustrative, and their positions will vary according to the required operating characteristic of a particular engine.

By providing two sets of exhaust valves with a variable valve operating system, two exhaust gas tracts leading respectively to a turbocharger and a turbocompounder, electronically controlling exhaust bypass passages and by placing one turbomachine downstream of the other, the possibilities for efficient extraction of energy, which would otherwise be wasted in the exhaust gas stream, are increased.

Figure 4:
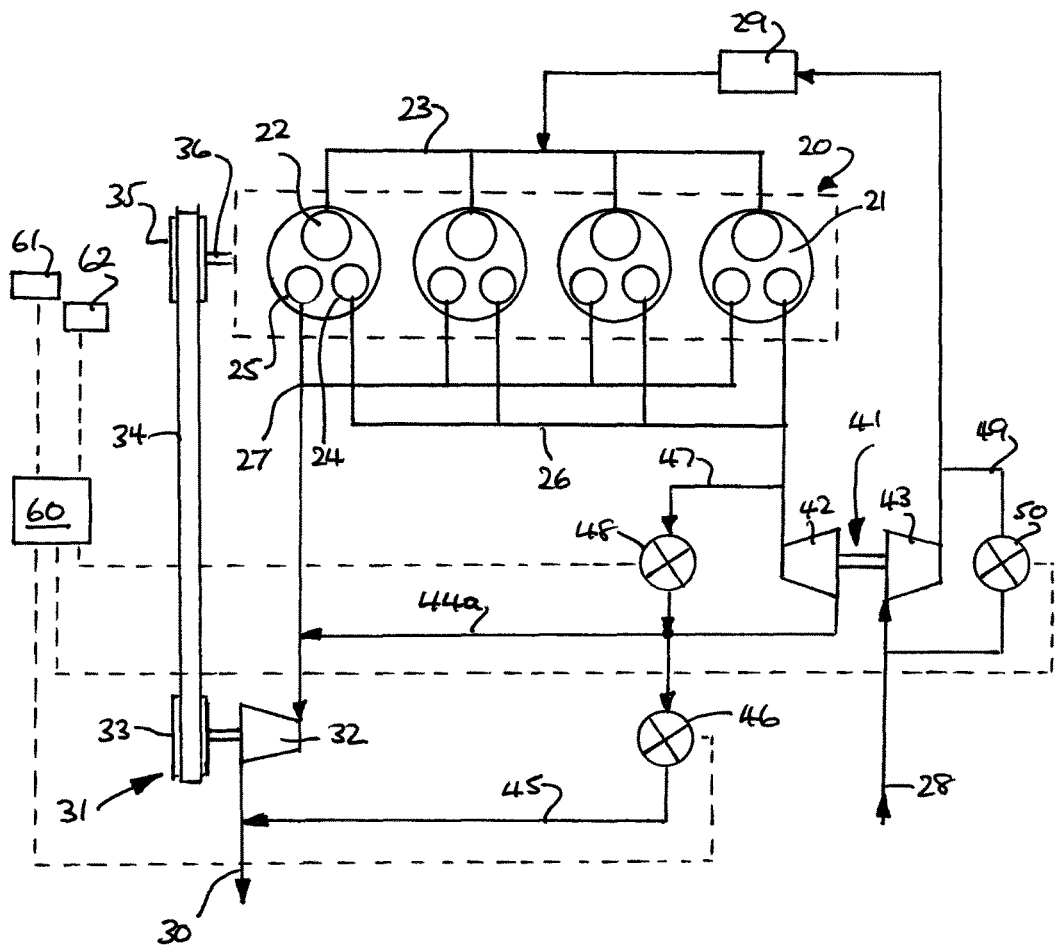
FIG. 4 illustrates schematically another embodiment of the invention.

In the embodiment of FIG. 4, the positions of turbocharger 41 and turbocompounder 31 are reversed. In this embodiment the initial pulse of exhaust gas energy (blow down) passes via exhaust valves 25 and the exhaust manifold 27 to the turbocompounder 31; in this condition the exhaust valves 24 are substantially closed. The mainstream of exhaust gas energy is subsequently directed via exhaust valve 24 and manifold 26 to the turbocharger 41; and in this condition the exhaust valves 25 are substantially closed. Opening and closing of valves 24, 25 will overlap to the intent that free flow of exhaust gas is not impeded.

The outlet of the turbocharger may be directed to the turbocompounder via tract 44a, valves 46, 48 being closed. Components are given the same reference numerals, and further description is unnecessary since operation of this embodiment is generally in accordance with that of FIG. 2.

Figure 5:
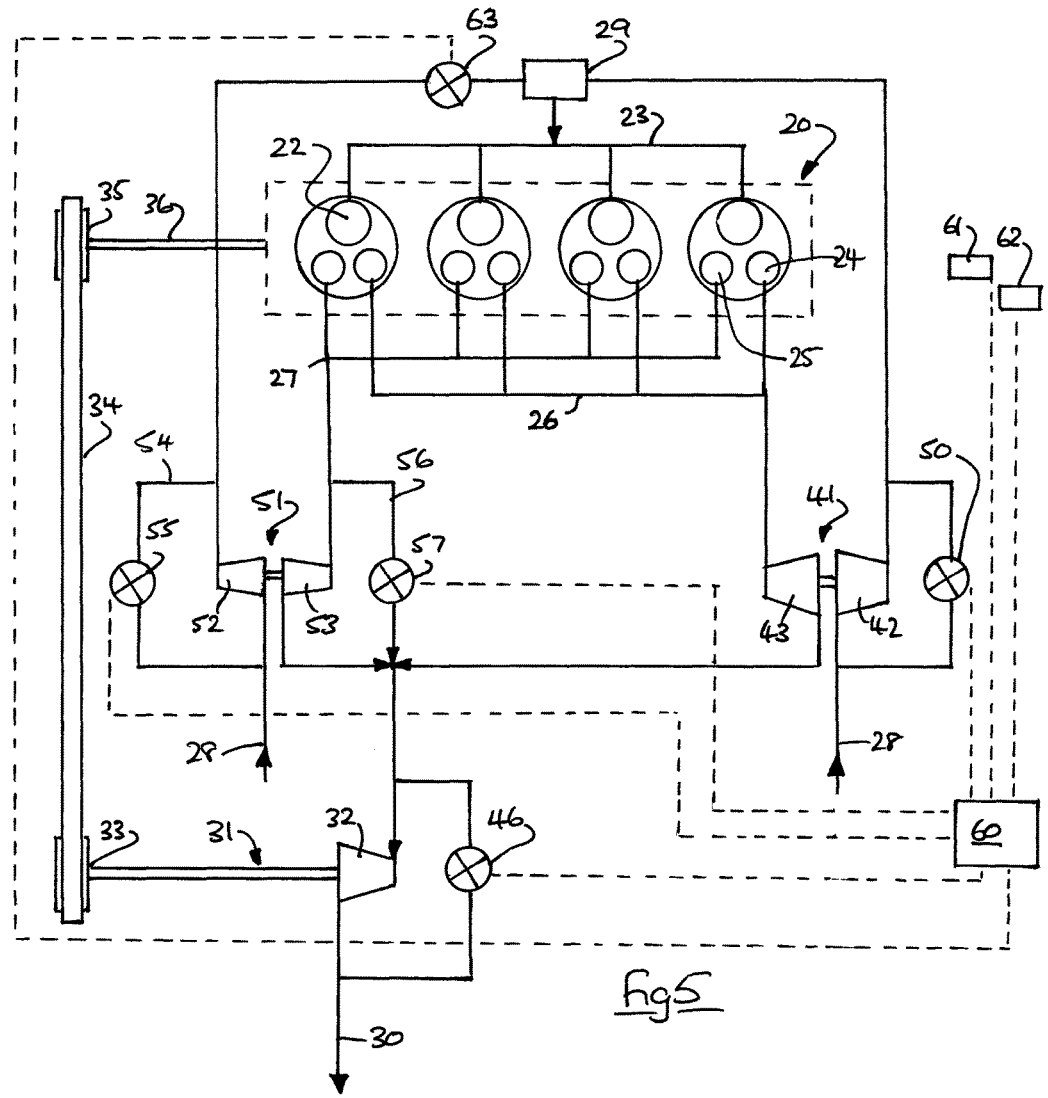
FIG. 5 illustrates schematically a further embodiment of the invention.

The embodiment of FIG. 5 corresponds to FIG. 3 with the addition of a second turbocharger 51 downstream of the exhaust manifold 27 and upstream of the turbocompounder 31. In effect the multiple exhaust gas pathways provide for parallel turbochargers 41, 51 each or both being capable of connection to a downstream turbocompounder 31. The components of FIG. 5 are given the same reference numerals where appropriate, and the second turbocharger 51 has a compressor 52, turbines 53, an inlet bypass passage 54 with a bypass valve 55, an exhaust bypass passage 56 with a bypass valve 57, both bypass valves being controlled via the ECU 60.

In the embodiment of FIG. 5, certain common reference numerals are omitted to improve clarity. The turbochargers 41, 51 may be sized differently so as to be effective at different rates of exhaust gas flow. The air inlets 28 may be common.

As before, the exhaust valves 24, 25 are controlled to ensure that exhaust gas first passes via manifold 27 and bypass valve 57 to the turbocompounder 51. The subsequent exhaust gas stream is directed via manifold 26, and may according to engine speed, pass through the high pressure turbine 51 or the low pressure turbine 41 or a combination of both according to known control techniques for parallel sequential turbochargers. The exhaust stream from both turbochargers is directed to the turbocompounder by ensuring that bypass valve 46 is closed.

Two further alternatives are illustrated in FIG. 5. A closure valve 63 is provided in the air inlet downstream of the turbocharger 51, and under control of the ECU. This closure valve 63 may close off this inlet path at low engine speeds when a dual inlet is not required. Furthermore, an exhaust bypass passage is not provided for the turbocharger 41, which is accordingly operative through the engine speed range; a bypass passage closable by a bypass valve could however be provided if considered desirable, in the manner of FIG. 3. Two inlets 26 are illustrated, but these could of course be combined, depending on the configuration of turbomachines about the engine.

The algorithm determining the operation of the variable valve timing system forms no part of the present invention, and in any event will be determined empirically for a particular engine. Such an algorithm may for example be embedded conventionally within an electronic control unit, and may be responsive to conventional inputs such as engine speed and engine load in order to make best use of exhaust gas flow throughout the engine operating range. In particular in a multi-cylinder engine, circumstances may require that all exhaust gas flow is through one or other set of exhaust valves, or through any combination of the two, and using any setting of exhaust valve opening area, exhaust valve timing and exhaust valve opening duration which is permitted by design of the exhaust side of the engine.

Certain aspects of the invention are stated in the numbered paragraphs that follow:

1. An internal combustion engine having a combustion chamber with two exhaust ports, each exhaust port having a respective exhaust valve for controlling independently the flow therethrough, wherein the respective exhaust ports are coupled via respective exhaust tracts to respective turbomachines, and the turbine outlet of one turbomachine is coupled to the turbine inlet of the other turbomachine.
2. An engine according to aspect 1, wherein said one turbomachine has an upstream bypass tract directly connecting the turbine inlet to the turbine outlet thereof, said upstream bypass tract being controlled by an upstream bypass valve.
3. An engine according to aspect 1, wherein said other turbomachine has a downstream bypass tract connecting the turbine inlet to the turbine outlet thereof, said downstream bypass tract being controlled by a downstream bypass valve.
4. An engine according to aspect 1 and comprising a further turbomachine in the exhaust tract to said other turbomachine.
5. An engine according to aspect 4, wherein said further turbomachine has a further bypass tract connecting the turbine inlet to the turbine outlet thereof, said further bypass tract being controlled by a further bypass valve.
6. An engine according to aspect 1, wherein one of said turbomachines is a turbocharger.
7. An engine according to aspect 1, wherein one of said turbomachines is a turbocompounder.
8. An engine according to aspect 7, wherein said engine comprises two turbomachines only.
9. An engine according to aspect 8, wherein said turbomachines comprise a turbocompounder upstream of a turbocharger.
10. An engine according to aspect 1, wherein said engine comprises three turbomachines only.
11. An engine according to aspect 10, wherein said engine comprises two turbochargers, one each associated with each exhaust tract, and a turbocompounder downstream of said turbochargers.
12. An engine according to aspect 11, wherein said turbochargers are in parallel.
13. An engine according to aspect 12, and including an inlet manifold, and a closure valve between one of said turbochargers and said inlet manifold.
14. An engine according to aspect 1, and having a turbine bypass tract for one or more of said turbomachines, and an electrically operable exhaust closure valve for each said turbine bypass tract, said engine also having an electronic controller in communication with each said closure valve for controlling opening and closing thereof.
15. An engine according to aspect 14, and having a compressor bypass tract for one or more of said turbomachines, and an electrically operable inlet closure valve for each said compressor bypass tract, said electronic controller being in communication with each said inlet closure valve for controlling opening and closing thereof.
16. An engine according to aspect 15, and having a plurality or turbochargers in parallel, one of said turbochargers having an inlet tract closure valve downstream thereof, said inlet tract closure valve being controlled by said electronic controller.
17. An engine according to aspect 1, and including a variable exhaust valve timing system, whereby the opening duration of one or more of said exhaust valves may be varied.
18. An engine according to aspect 1, and including a variable exhaust valve timing system whereby the opening area of one or more of said exhaust valves may be varied.
19. An engine according to aspect 1, and including a variable exhaust valve timing system whereby the timing of opening and/or closing of one of said exhaust valves may be varied with respect to rotation of an output member thereof.
20. A multi-cylinder engine according to aspect 17, or aspect 18, or aspect 19, each combustion chamber thereof having two said exhaust ports with respective exhaust valves, one exhaust valve of each combustion chamber being associated with a first exhaust valve timing system, and one exhaust valve of each combustion chamber being associated with a second exhaust valve timing system.
21. A vehicle having an internal combustion engine according to aspect 1.

The invention claimed is:
1. A vehicle system, comprising:
an internal combustion engine having a combustion chamber with two exhaust ports each having a respective exhaust valve for controlling independently the flow therethrough, wherein the respective exhaust ports are coupled via respective exhaust tracts to respective turbomachines, each having a turbine inlet and a turbine outlet, and the turbine outlet of one turbomachine is coupled to the turbine inlet of the other turbomachine, wherein a first of the turbomachines has a first bypass tract directly connecting the turbine inlet of the first of the turbomachines to the turbine outlet of the first of the turbomachines, said first bypass tract being controlled by a first bypass valve, wherein a second of the turbomachines is a turbocompounder, and wherein said second of the turbomachines has a second bypass tract directly connecting the turbine inlet of said second of the turbomachines to the turbine outlet of said second of the turbomachines, said second bypass tract being controlled by a second bypass valve; and, an electronic control unit configured to control a degree of opening of the first and second bypass valves in dependence on an output torque of the engine and a speed of the engine.

2. A vehicle system according to claim 1, wherein the electronic control unit is configured to open the first and second bypass valves when the output torque of the engine is below a first threshold output torque value.

3. A vehicle system according to claim 2, wherein the electronic control unit is configured to open the first bypass valve and close the second bypass valve when the output torque of the engine is above the first threshold output torque value and below a second threshold output torque value greater than the first threshold output torque value.

4. A vehicle system according to claim 3, wherein the electronic control unit is configured to close the first bypass valve and open the second bypass valve when the output torque of the engine is above the second threshold output torque value and below a third threshold output torque value greater than the second threshold output torque value.

5. A vehicle system according to claim 4, wherein the electronic control unit is configured to open the first and second bypass valves when the output torque of the engine is above the third threshold output torque value.

6. A vehicle system according to claim 1, comprising a further turbomachine in one of the exhaust tracts.

7. A vehicle system according to claim 6, wherein said further turbomachine has a further bypass tract connecting the turbine inlet of the further turbomachine to the turbine outlet of the further turbomachine, said further bypass tract being controlled by a further bypass valve.

8. A vehicle system according to claim 1, wherein said first turbomachine is a turbocharger.

9. A vehicle system according to claim 1, wherein said engine comprises two turbomachines only.

10. A vehicle system according to claim 1, wherein said turbomachines comprise said turbocompounder upstream or downstream of a turbocharger.

11. A vehicle system according to claim 10, wherein said turbomachines comprise two turbochargers and said turbocompounder downstream of said turbochargers.

12. A vehicle system according to claim 11, wherein said turbochargers are in parallel.

13. A vehicle system according to claim 1, comprising a further turbomachine and wherein the engine has the three turbomachines only.

14. A vehicle system according to claim 1, comprising:
at least one electrically operable exhaust closure valve for one or each of said second bypass tract and said first bypass tract, and
an electronic controller in communication with said at least one electrically operable exhaust closure valve for controlling opening and closing thereof.

15. A vehicle system according to claim 14, comprising a compressor bypass tract for said first turbomachine, and
an electrically operable inlet closure valve for said compressor bypass tract, said electronic controller being in communication with said inlet closure valve for controlling opening and closing thereof.

16. A vehicle system according to claim 15, comprising a plurality of turbochargers in parallel, one of said turbochargers having an inlet tract closure valve downstream thereof, said inlet tract closure valve being controlled by said electronic controller.

17. A vehicle system according to claim 1, comprising an electronic variable exhaust valve controller configured to vary an opening area of one or more of said exhaust valves.

18. A vehicle system according to claim 1, comprising an electronic variable exhaust valve controller configured to vary a timing of opening and/or closing of one of said exhaust valves with respect to rotation of an output member of the one of said exhaust valves.

19. A vehicle system according to claim 18, wherein the electronic variable exhaust valve controller is configured to control the exhaust port coupled to the second exhaust tract to open for a first period of time, and the exhaust port coupled to the first exhaust tract to open for a second period of time after the first period of time.

20. A vehicle having a vehicle system according to claim 1.

* * * * *